United States Patent [19]
Keim

[11] 3,789,793
[45] Feb. 5, 1974

[54] METHOD OF DETECTING WIND AT A MID-POINT OF A SAIL AND MEANS THEREFOR

[76] Inventor: Melville Keim, 933 via Lido Soud, Newport Beach, Calif. 92660

[22] Filed: Nov. 21, 1972

[21] Appl. No.: 308,311

[52] U.S. Cl. .................. 116/114 R, 24/108, 73/188
[51] Int. Cl. ........................................... G01d 21/00
[58] Field of Search ..... 116/114 R; 24/108; 73/180, 73/188, 189

[56] References Cited
UNITED STATES PATENTS 3,395,577  8/1968  Keim..................................... 73/188
3,654,807  4/1972  Deskey................................. 73/180
3,689,962  9/1972  Erickson.............................. 24/108

OTHER PUBLICATIONS

Publication: "Sailing Made Easy" page 22, 1959, Dodd, Mead & Company, N.Y.

Primary Examiner—Louis J. Capozi

[57] ABSTRACT

Wind indication and direction may be sensed by a flexible strip attached to the surface of a sail. A button member and a reception member attach the flexible strip to a selected point on the sail. A pair of flexible strips may be attached on opposite sides of the sail to indicate the presence and direction of wind from vantage points on either side of the sail.

17 Claims, 6 Drawing Figures

PATENTED FEB 5 1974 3,789,793

3,789,793

METHOD OF DETECTING WIND AT A MID-POINT OF A SAIL AND MEANS THEREFOR

BACKGROUND OF THE INVENTION

Constant knowledge of the specific direction of wind is critical to the proper operation of a sailboat. The course that the helmsman steers to achieve maximum efficiency and speed is based almost entirely on the direction of the wind.

Under typical sailing conditions the wind is constantly changing in force and direction. While the helmsman knows the amount and direction of the wind in general by observing the sails, a much faster and accurate method of sensing the direction of the wind would help the helmsman steer a better course.

Typically the direction of the wind on a sail boat is ascertained by visual inspection of the sail or alternatively by having wind flags placed at appropriate places on the deck of the boat. Visual inspection of the sail indicates only generally to the helmsman the direction of the wind because of the constant changes in force and direction of the wind which cause the sail to move inconsistently. Flags on the deck of the boat likewise give only a general indication since the wind directly on the sails may be quite different than the surface wind detected by deck flags.

Accordingly, a primary object of the present invention is to provide a wind indication means for indicating the direction of the wind directly on the surface of the sails.

Another object of the present invention is to provide a simple and effective means indicating the amount and direction of wind at a plurality of selective surfaces on the sail.

A further object of the present invention is to provide a wind indicating device adapted to be attached to the sale without requiring substantial modification of the sail.

It is still another object of the present invention to provide a method for indicating the amount and direction of wind at various selected points on the surfaces of a sail so as to be visible from both sides of the sail.

Other objects and advantages of the present invention will be obvious from the detailed description of the preferred embodiment given hereinbelow.

SUMMARY OF THE INVENTION

The aforementioned objects are realized by the present invention which includes apparatus and method for fastening at least one flexible strip at a selected midpoint on the surface of a sail. The device includes a button member adapted to extend through one side of the sail and be held at the other side of the sail by a reception member. The reception member is connected to the end portion of the button member to provide a nonremovable fastener. Both sides of the sale may have a flexible strip to indicate amount of and direction of wind on both sides.

The device is especially adapted to extend through the side of the sail without prior preparation of a hole in the sail and is easily mounted at a selected point on the sail by pushing the button member through the sail with the flexible strips connected thereto. Several flexible strips may be attached at selected points on the faces of the sail to provide wind indication at desired points. A cheap and easily attachable device is provided and flexible strips are visible to the helmsman in indicating the direction and amount of the wind directly on the sails.

DESCRIPTION OF THE PREFERRED EMBODIMENT

Figure 1:
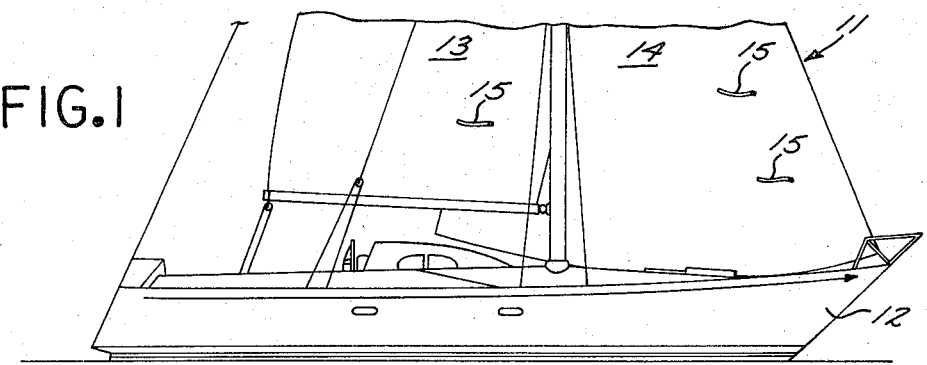
FIG. 1 illustrates a sailboat with a pair of sails having the wind indication apparatus of the present invention attached at selected points on the surface of the sails.

Referring to the drawings and particularly to FIG. 1, a sailboat 11 is illustrated heading in an upwind direction shown by the arrow 12. The boat 11 as shown has a pair of sail rigs with the jib sail rig 14 having wind indicating means 15 attached at two selected midpoints on the sail 14 and the main rig sail 13 having wind indicating means 15 attached at one selected point. The selected points of attachment of the wind indicating means 15 will depend on the operating characteristics of the sailboat. Typically as shown in FIG. 1, one wind indicating means 15 may be placed about one-third aft of the mast and about one-third of the sail height above the boom on the surface of the main rig sail 13. On the jib rig sail 14 a pair of indicating means 15 may be placed about 8 to 12 inches aft of the jib with one located about one-third of the luft height and the other about two-thirds of the luft height.

Figure 2:
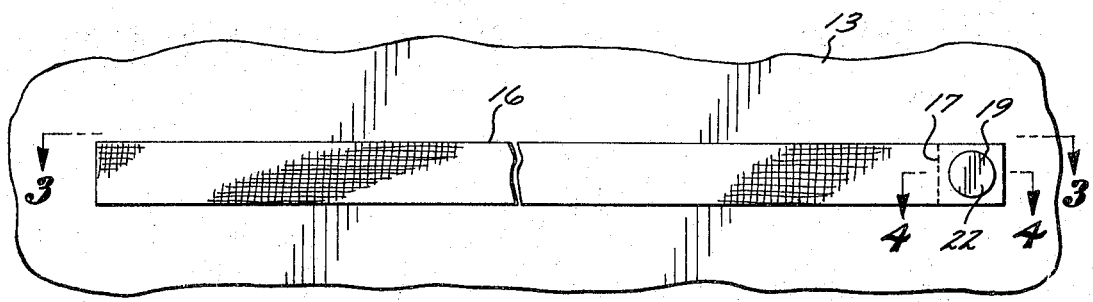
FIG. 2 is an enlarged elevation view of the surface of one of the sails of FIG. 1 showing the position of a flexible strip along the surface of the sail when the sailboat is facing upwind.

As particularly illustrated in FIG. 2 the wind indicating means 15 includes a flexible strip 16 attached to the surface of the sail 13 (for example) on one side thereof. An identical strip (not shown) may be located on the other side of the sail 13.

The flexible strip 16 is attached to the sail at one end by a pair of members (to be described) and extends along the surface of the sail 13 in a horizontal direction as shown when the boat is properly headed upwind to maintain maximum efficiency. The strip 16 is preferably folded over on itself at the one end as shown by the dotted line 17.

Figure 3:
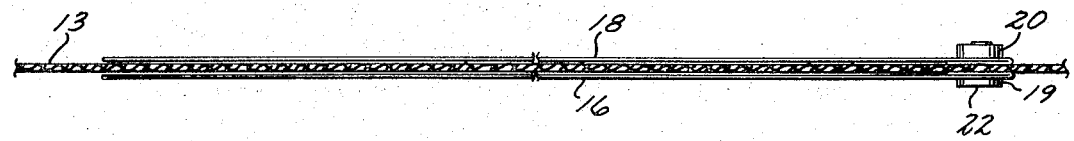
FIG. 3 is a sectional view of the wind indication means of FIG. 2 showing flexible strips on both sides of the sail.

FIG. 3 illustrates a pair of flexible strips 16 and 18 attached to opposite sides of the sail 13 by a device having a button member 19 extending from one side of the sail 13 through the flexible strip 16, the sail 13 and through the flexible strip 18 to be connected by a reception member 20 at the other side of the sail 13.

Figure 4:
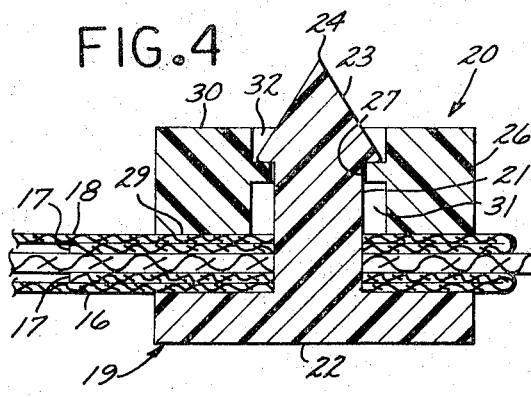
FIG. 4 is an enlarged sectional view taken on the line 4—4 of FIG. 2 illustrating the position of the reception member relative to the button member for a thin sail.
Figure 5:
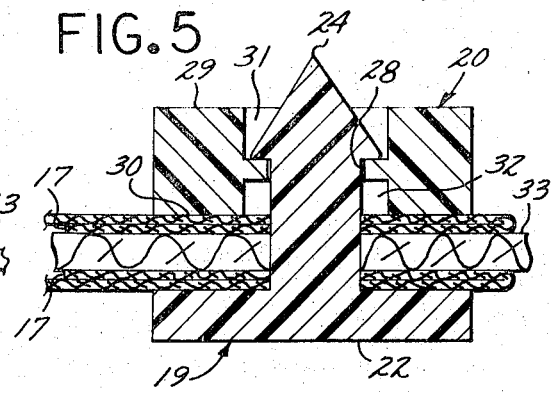
FIG. 5 shows the position of the reception member relative to the button member for a thick sail; and, FIG. 6 illustrates the wind indication device of the invention after the button member has been sheared at one end to be flush with the face of the reception member.

The apparatus for attaching the flexible strips to the sail is particularly illustrated in FIGS. 4 and 5. In FIG.

4 a relatively thin sail 13 has flexible strips 16 and 18 attached on both sides thereof by a button member included generally at 19 having a stem portion 21 extending from a central portion of an annular flange portion 22 through the flexible strips 16 and 18 and the sail 13. The stem portion 11 has an enlargement comprising a conically shaped body 23 projecting away from the flange portion 22. The body 23 has a pointed end 24 for facilitating the movement of the stem portion 21 through the sail and flexible strips. The conically shaped body 23 is preferably made of a plastic material and can easily be sheared off to be described hereinbelow.

The reception member indicated generally as 20 has a body 26 of predetermined thickness adapted for receiving the conically shaped body 23. A wall 27 on the body 26 forms an opening 28 for receiving the conically shaped body 23 therethrough. The opening 28 has a diameter slightly smaller than the diameter of the conically shaped body 23 whereby an interference fit results when the conically shaped body 26 fits through the opening 28. The step portion 21 is prevented from withdrawing through the opening 28 by the connection between the enlargement of the stem portion 21 and the wall 27 on the reception member 20.

The opening 28 extends the entire thickness of the body 26 from a face 29 to a face 30. A pair of counterbores 31 and 32 around the opening 28 form annular relief areas at the body faces 29 and 30, respectively. The counterbore 31 is deeper from the body face 29 than the counterbore 32 is from the body face 30 with the result that the reception member 20 in FIG. 4 has the body face 29 facing a relatively thin sail such as the sail 13 in FIG. 4.

The length of the conically shaped body 23 is greater than the depth of either of the counterbores 31 or 32 so that the pointed end 24 will extend through the reception member 20 beyond the face 30. This facilitates the connection of the reception member 20 with the button member 19 during attachment of the apparatus to the sail 13.

In the device of FIG. 5 a sail 33, thicker than the sail 13 of FIG. 4, has the stem portion 21 extending therethrough and connected to the reception member 25 with the position of the reception member reversed from that shown in FIG. 4 with the thin sail 13. In FIG. 5 the face 30 faces the sail 33 with the counterbore 32 of lesser depth. In this manner the pointed member 24 extends beyond the reception member 20 approximately the same distance with a thin sail in FIG. 4 as with a thick sail in FIG. 5.

Figure 6:
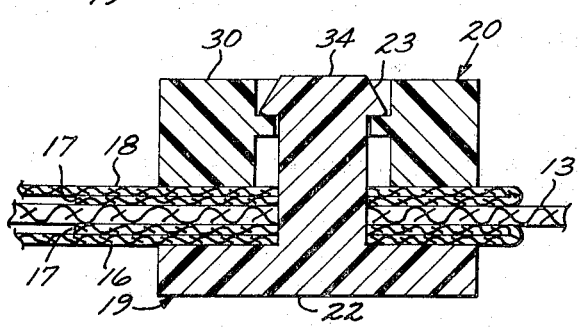

FIG. 6 shows the device wherein the conically shaped body 23 of the stem portion 21 is illustrated with the pointed end having been removed. A face 34 on the body 23 is flush with the face 30. With the installation of FIG. 6 a smooth attachment to the sail is realized.

The installation of the wind indicating means of the present invention is accomplished in the following manner:

Points on the surface of the sail are selected according to the type of sailboat. The selected points should be easily visible to the helmsman on the deck and as high as possible to more accurately reflect the wind conditions on the sails. A pin or sailsmaker's needle may be used to open the weave in the sail at the selected points. One end of a flexible strip is placed on the stem portion and the button member is partially extended through the hole in the sail. A second flexible strip is then placed on the stem portion. The reception member is then connected to the buttom member in interference fit until the members are in a locked position. After locking, the button member is prevented from being removed through the sail by the interference fit.

The flexible strips may be removed from the sail by cutting the strips off with scissors, or the like, leaving the button and reception members permanently attached to the sail and thus in effect forming an integral part of the sail.

The wind indicating means of the present invention is relatively cheap to manufacture and is easily attached to the sail. Since the flexible strips are easily removable by cutting and the remainder of the device remains, no difficulty is encountered in attachment or removal.

Although there have been described above specific arrangements of an improved wind indicator for use with sailboats in accordance with the invention for the purpose of illustrating the manner in which the invention may be used to advantage, it should be appreciated that the invention is not limited thereto. Accordingly, any and all accommodations, variations, and equivalent arrangements which come within the scope of the appended claims should be considered to be a part of the invention.

I claim:

1. Wind indication means particularly adapted to be mounted at a selected mid-point on the surface of a sail, said wind indication means comprising:
   a button member;
   said button member being adapted to extend partially through the surface of the sail;
   a reception member;
   connection means on said button member and said reception member selectively connecting said button member and said reception member for preventing said button member from withdrawing through the sail after said button member has been partially extended through the sail;
   and at least one relatively long flexible strip connected to said button member whereby the wind on the sail will cause said flexible strip to flow along the surface of the sail.

2. The wind indication means set forth in claim 1 wherein said button member comprises:
   a flange portion;
   a stem portion extending from a central portion of said flange portion;
   said stem portion being adapted to extend through the surface of the sail;
   and wherein said connection means comprises:
   an enlargement on said stem portion of predetermined diameter;
   and a wall on said reception member forming an opening extended from a first face to a second face of said reception member, said opening being of a diameter slightly smaller than the diameter of said enlargement and adapted to receive said enlargement therethrough in an interference fit, said wall extending a minimum of over one-half way around said stem portion when said enlargement is received within said opening.

3. The wind indication means set forth in claim 2 wherein said reception member comprises:
a body having a predetermined thickness through which said opening extends from a first face to a second face on said body;
a first and a second counterbore around said opening forming an annular relief area around said opening at said first and second body faces, respectively, said first counterbore being deeper from said first body face than said second counterbore is from said second body face whereby said reception member may be connected to said button member with said first body face facing the sail when the sail is thin and said second body face facing the sail when the sail is thick.

4. The wind indication means set forth in claim 2 wherein said enlargement comprises:
a conically shaped body projecting away from said flange portion, said conically shaped body having a pointed portion for facilitating the movement of said stem portion through a sail, said conically shaped body being of a plastic material and having a predetermined length in the direction which it extends away from said flange portion, said predetermined length being greater than the depth of either said first or said second counterbore, whereby said stem portion may be inserted through a sail and then said pointed portion can be easily removed substantially flush with the face of said reception member which is away from said button member.

5. The wind indication means set forth in claim 2 wherein:
said wall on said reception member extends all the way around said opening.

6. The wind indication means set forth in claim 2 wherein said one flexible strip is adapted to be connected between said flange portion and the sail and wherein is included:
a second flexible strip adapted to be connected between the sail and said reception member.

7. The wind indication means set forth in claim 2 wherein:
said reception member is connected to said stem portion at a distance from said flange portion slightly greater than the thickness of the sail.

8. In combination with the wind indication means set forth in claim 2:
a sail having first and second surfaces;
said flange portion being on said first surface and said reception member being on said second surface;
said one flexible strip having one end connected to said button member on said first side of said sail.

9. The combination recited in claim 8 wherein:
said one flexible strip is folded over on itself at said one end, and said strip is connected to said button member by said stem portion being extended through said one end.

10. The combination recited in claim 8 wherein said reception member comprises:
a body having a predetermined thickness through which said opening extends from a first face to a second face on said body;
a first and a second counterbore around said opening forming an annular relief area round said opening at said first and second body faces, respectively, said first counterbore being deeper from said first body face than said second counterbore is from said second body face whereby said reception member may be connected to said button member with said first body face facing the sail when the sail is thin and said second body face facing the sail when the sail is thick.

11. The combination recited in claim 8 wherein said enlargement comprises:
a conically shaped body projecting away from said flange portion, said conically shaped body having a pointed portion for facilitating the movement of said stem portion through a sail, said conically shaped body being of a plastic material and having a predetermined length in the direction which it extends away from said flange portion said predetermined length being greater than the depth of either said first or said second counterbore, whereby said stem portion may be inserted through a sail and then said pointed portion can be easily removed substantially flush with the face of said reception member which is away from said button member.

12. A method of installing wind indication means at a predetermined point on the surface of a sail said method including the steps of:
placing one end of a relatively long flexible strip on a stem portion of a button member and forcing said stem portion through said strip;
positioning one end of said strip in contact with said flange portion on said button member;
forcing said stem portion through a sail from one side of the sail until the stem projects beyond the other side of the sail.

13. The method set forth in claim 12 including the steps of:
forcing the end of said stem portion through one end of a second relatively long flexible strip, and locating said one end of said second strip in contact with the other side of the sail;
placing a reception member, having an opening therethrough from a first face to a second face, around said stem portion, said opening having a smaller diameter than the diameter of said stem portion;
and forcing said stem through said opening whereby said reception member is held to said button member by an interference fit.

14. The method set forth in claim 12 wherein said reception member has a counterbore around said opening at said second face of said reception member and said stem portion has a conically shaped body at its end which is larger than the main body of said stem portion, said conically shaped body being of greater length than the depth of said counterbore, including the steps of:
inserting said conically shaped body through said opening and positioning said stem portion in said counterbore;
removing the portion of said conically shaped body which extends out of said counterbore by virtue of said conically shaped body being longer than said counterbore is deep.

15. The method set forth in claim 12 wherein said reception member has a second counterbore around said opening at said first face which second counterbore is deeper than said first counterbore, including the steps of:

observing the distance that said stem portion extends through the sail;

determining which face of said reception member should be facing the sail depending upon the distance that said stem portion extends through the sail;

and forcing said stem portion through the opening of said reception member with the determined face of said reception member facing the sail.

16. The method set forth in claim 12 including the steps of:

placing one end of a second relatively long flexible strip in proximity to the end of said stem portion and forcing said stem portion through one end of said second strip before said reception member is received onto said stem portion.

17. The method set forth in claim 12 including the steps of:

forcing a hole in said sail with a separate pointed instrument at the selected location before forcing said stem through the sail.

* * * * *